May 2, 1950     F. M. GUY     2,505,766
RESILIENT BUSHING
Filed Oct. 9, 1946
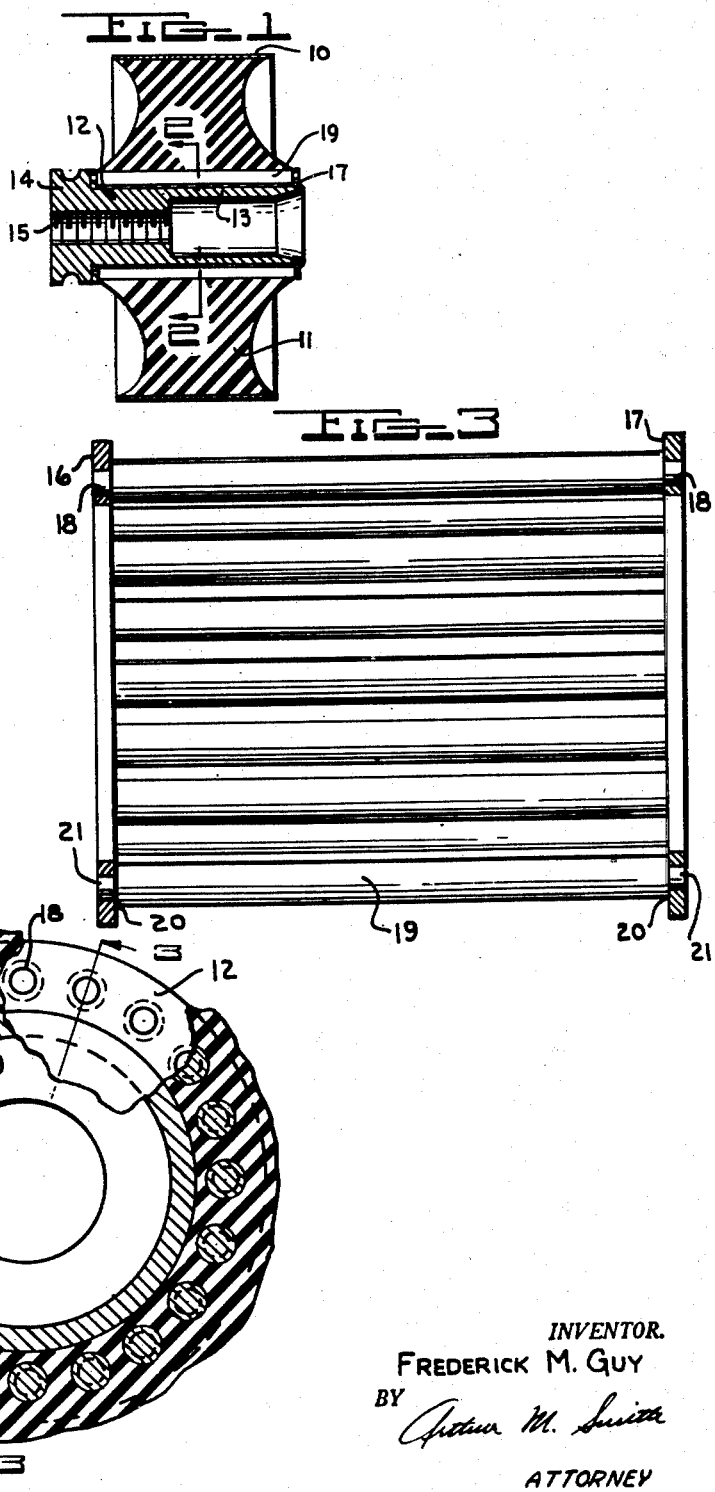
INVENTOR.
FREDERICK M. GUY
BY Arthur M. Smith
ATTORNEY Patented May 2, 1950

2,505,766

UNITED STATES PATENT OFFICE 2,505,766

RESILIENT BUSHING

Frederick M. Guy, Detroit, Mich., assignor to Guy & Murton, Inc., Detroit, Mich., a corporation of Michigan Application October 9, 1946, Serial No. 702,241

9 Claims. (Cl. 287—85)

The present invention relates to a resilient bushing and more particularly to such a bushing in which a body member formed of a resilient material is secured as by bonding or vulcanizing to a substantially non-resilient central core and to a circumferential shell portion which may be either a rigid or a yieldable but substantially non-resilient material.

Resilient bushings of the present invention are an improvement on the resilient bushings shown in my United States Letters Patent No. 1,978,940, issued October 30, 1934, and are designed particularly to withstand severe load and operating conditions without substantial deterioration of the bushing. By way of example, but not of limitation, the resilient bushings embodying the present invention are particularly adapted for use in resilient universal joints or couplings of the type shown in my prior United States Letters Patent No. 1,978,939, issued October 30, 1934, and No. 2,195,647, issued October 2, 1940, as well as in other like or similar devices in which a driving and a driven member are connected in driving relationship in such a manner as to permit various misalignments thereof while coupled in a driving relationship. Other uses for resilient bushings embodying the present invention include, by way of example, engine mountings, spring shackles, clutches, sound and vibration insulators or dampeners, and resilient cushions for mounting or connecting various mechanical parts or units. In all such uses, it is essential that the resilient bushing be held in place or securely connected with mechanical connections to both its core and its circumferential shell in such a manner as to eliminate relative movement between such connections and the core or the shell, as the case may be. This requires that both the core and the shell have sufficient longitudinal rigidity so that the mechanical connections may be tightly clamped thereon without causing the collapse of the core or shell.

It has been proposed heretofore to provide a preloaded resilient bushing by a process in which pressures in excess of the elastic limit of the resilient material are imposed on the resilient material which is locked between a rigid core or stud and a rigid circumferential shell. Such devices have a relatively limited field of application since a high degree of preloading of the resilient material is depended upon to hold the parts of the bushing in their respective positions. In many instances, this preloading destoys the degree of resiliency required for the optimum operation of the bushing.

It also has been proposed heretofore to bond a rigid imperforate core or stud and a rigid circumferential shell to the body portion of resilient materials. In such construction, the resilient material is bonded to a relatively restricted surface area which causes a premature failure of the bushing under many of the load conditions to which this bushing is subjected when in use.

The resilient body portion of a resilient bushing embodying the present invention may be formed of any desired elastomeric material which has the required resilient properties. Rubber, either natural or synthetic, or blends thereof, is a satisfactory material and is the material most frequently employed for use in such bushing. For particular applications, however, other suitable resilient elastomeric materials also may be utilized within the scope of the present invention.

I have found that a satisfactory construction of a radially yieldable core and a circumferential shell, in those instances where a yieldable shell is indicated, is that which provides a high degree of rigidity in a longitudinal direction while flexing radially. To assure a positive union between the resilient material and the materials forming the flexible core or shell, if used, it is desirable to provide a construction which provides the maximum surface areas of contact between the core or shell-forming materials and the resilient material. This increases the useful service life of such bushings since it eliminates one frequent cause of failure due to rupture of the bond between the bore or shell-forming material and the body of the resilient material disposed between them.

It is, therefore, an object of the present invention to provide a resilient block having a long service life under severe operating conditions and which is simple in its construction and which may be readily attached at the point where it is to be used without impairing the efficiency of the resilient element.

It is a further object of the present invention to provide a resilient block which may be resiliently secured in the desired assembly without wear of the resilient element or of the core or the shell due to relative movements between the parts of the assembly and the surface of the resilient element, except as such movements may be permitted by the displacement of the resilient element.

It is a further object of the present invention to provide a resilient bushing in which localized strains in the resilient element are eliminated thereby increasing the useful service life of the bushing.

Other objects of this invention will appear in the following description and appended claims, reference being had to the accompanying drawings forming a part of this specification wherein like reference characters designate corresponding parts in the several views.

In the drawing:

Fig. 1 is a cross-section of a resilient bushing embodying the novel core construction of the present invention.

Fig. 2 is an enlarged partial section taken substantially on the line 2—2 in the direction of the arrows, Fig. 1.

Fig. 3 is an enlarged section of the core construction taken substantially on the line 3—3, Fig. 2, in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The novel feature of the present invention resides primarily in the core construction herein disclosed. As shown in Fig. 1, this core construction may be utilized in the formation of a resilient bushing member which includes an outer circumferential shell 10 and a resilient body portion 11. The resilient body portion 11 is secured to the inner surfaces of the circumferential shell portion 10 and is molded around the structural elements of the core member referred to generally by the numeral 12. A stud 13 is secured to the core member embodying the present invention and is provided with an enlarged head portion 14 and a drilled and tapped opening 15 to which a connector bolt or stud (not shown) may be secured. In one instance, the bolt or stud connected with the threaded opening 15 in the member 14 is connected to a cross head (not shown) which is connected with either a driving or a driven shaft while the shell 10 is connected with the other shaft. Thus a driving connection is effected through the resilient bushing and misalignments of the connected members is permitted by relative movement between the core 12 and the shell 10. It is to be understood, however that the core construction of the present invention may be applied to other types of bushings than that shown in Fig. 1, and, in general, may be employed wherever a rigid mechanical connection is to be made with a resilient material which may be molded around the core member.

Instances of such uses of the core structure embodying the present invention will be found in various types of connecting grommets or the like in various types of resilient materials. When so used, the core members of the present invention provide a point for a rigid mechanical connection between the mass of the resilient material and a mechanical clamp or connector without impairing the resiliency of the material and while permitting bodily movement or displacement of the core member relative to the resilient material.

The core construction is shown in detail in Figs. 2 and 3 and includes the annular end members 16 and 17 each of which is pierced with a plurality of locating holes 18 whose centers are spaced on a line located concentrically with respect to the inner periphery of the said annular members 16 and 17. A plurality of rigid cylindrical rod members 19 are each provided with an offset shoulder 20 and a reduced end 21. Each of the reduced ends 21 are of a suitable diameter to fit within the holes 18 provided in the annular end members 16 and 17. Each of the shoulders 20 on the rod members 19 contact the surfaces of the annular members 16 and 17 and hold the annular members 16 and 17 in spaced relation to each other. The reduced ends 21 provided on the ends of the rod members 19 are received in the holes 18 provided in the annular members 16 and 17. Thus each rod member 19 aligns the holes 18 provided in the annular members 16 and 17. The circumferential distance between adjacent rod members 19 is fixed by the spacing of the holes 18 in the members 16 and 17.

This construction therefore provides a core member in the form of a cylindrical open ended cage having a plurality of spaced horizontally extending bars secured between the annular end members forming the ends of the cage. As shown in Fig. 2, when the resilient material 11 is molded around the core member, a series of interlocking key portions 22 is provided. Each of the interlocking portions 22 extends around two of the rod members 19 and completely fills the space between the said members 19. Thus it will be seen that the resilient material completely engages the exposed surfaces of the rod member 19 and extends around the said members so that the members 19 are embedded in the resilient material. Hence, any strain tending to separate the core member from the resilient material is transferred into the body of the resilient material through the series of interlocking portions 22, and this provides a strong yet yielding connection between the core member and the body of the resilient material.

It will be seen that the construction herein disclosed provides a core member which provides a large surface area available for bonding to the resilient material and also provides a construction which has a high degree of resistance to the forces imposed thereon during conventional types of molding operations. It has been found that certain other types of bushings do not have sufficient resistance to crushing forces imposed thereon during the molding operation and that scrap results from the collapse of the core members during the molding operations. Utilizing a core constructed as herein disclosed will provide a core having sufficient resistance to crushing loads that scrap attributable to collapse of the core portions during the molding operation is practically eliminated.

In the construction here shown, it is contemplated that the annular members 16 and 17 will be formed of a rigid material so as to hold the rod members 19 on fixed centers. Such a core is movable by bodily displacement relative to the resilient material. If, however, a radially yieldable core is desired, the members 16 and 17 may be formed of a yieldable material so that an enlarged or oversized stud member 13 may be inserted therein to effect a radial movement of each of the rod members 19 by stretching the members 16 and 17. Such a yielding core construction is particularly desirable in those instances where a preloading of the bushing is desired which can be accomplished by the use of an oversized stud member to effect radial enlargement of the annular opening surrounding the core structure.

The round cylindrical body surfaces of the rod members 19 can be readily surrounded by the body of the resilient material and, due to the absence of any sharp-edged portions, a condition is avoided in which localized wear or cutting may occur in the resilient member.

I claim:

1. In a resilient bushing of the type having a resilient body adapted to positively connect two separate members and to hold said members in spaced relation without metal to metal contact and to absorb vibrations from said members, a core comprising a pair of spaced, ragid, annular end members pierced to provide a plurality of locating holes on spaced centers located on a line concentric with the annulus of said end members, and longitudinally rigid rod members, each having one end secured in one of the locating holes in one of said annular end members and having its opposite end secured in one of the locating holes in the other of said annular end members.

2. In a resilient bushing of the type having a resilient body adapted to positively connect two separate members and to hold said members in spaced relation without metal to metal contact and to absorb vibration from said members, a core comprising a pair of spaced, rigid, annular end members and a plurality of separate longitudinally rigid cylindrical rod members, a plurality of spaced rod locating holes in each of said annular end members, the diameters of said holes being less than the diameters of said cylindrical rod members, and a reduced portion on each end of said cylindrical rod members extending outwardly from a shoulder formed thereon and adapted to provide a tight fit in the said rod locating holes in said annular end members.

3. A resilient bushing comprising an outer shell and a spaced central core comprising an open cylindrical member consisting of spaced annular end members and a plurality of longitudinally rigid rod elements secured between said annular end members and equally spaced circumferentially thereof, a resilient element secured to said outer shell and molded around the said rod elements of said central core to form a series of resilient interlocking tongue members integral with the body portion of the said resilient element, one of said interlocking tongues extending between each pair of said spaced rod elements.

4. A resilient bushing comprising an outer shell and a spaced central core comprising a pair of spaced end members and a plurality of spaced longitudinally rigid rod members secured between said end members, a resilient element secured to said outer shell and molded around the rod members of said central core to form a series of resilient interlocking tongue members integral with the body portion of the said resilient element, one of said interlocking tongues extending between each pair of said spaced rod members.

5. A resilient bushing comprising an outer shell and a spaced central core comprising a pair of spaced rigid annular end members pierced to provide a plurality of locating holes on spaced centers located on a line concentric with the annulus of said end members and rigid longitudinally extending rod members each having one end secured in one of the locating holes in one of said annular end members and having its opposite end secured in one of the locating holes in the other of said annular end members, a resilient element secured to said outer shell and molded around said central core to form a series of resilient interlocking tongue members integral with the body portion of the said resilient element, one of said interlocking tongues extending between each pair of said rigid rod members.

6. A resilient bushing comprising an outer shell and a spaced central core comprising a pair of spaced end members and a plurality of separate longtiudinally rigid cylindrical rod members, a plurality of spaced rod locating holes in each of said annular end members, the diameter of each of said holes being less than the diameter of said cylindrical rod members, and a reduced portion on each end of said cylindrical rod members extending outwardly from a shoulder formed thereon and adapted to provide a close fit in the said rod locating holes, a resilient element secured to said outer shell and molded around said central core to form a series of resilient interlocking tongue members integral with the body portion of the said resilient element, one of said interlocking tongues extending between each pair of said spaced rod elements.

7. A resilient bushing comprising an outer shell and a spaced central core comprising a pair of spaced annular end members and a plurality of separate longitudinally rigid cylindrical rods secured to said end members and circumferentially spaced from each other to prevent relative movement of said end members toward each other, a resilient element secured to said outer shell and molded around said central core to form a series of resilient interlocking tongue members integral with the body portion of the said resilient element, one of said interlocking tongues extending between each pair of said spaced rod elements.

8. In a resilient bushing of the type having a resilient body adapted to positively connect two separate members and to hold said members in spaced relation without metal to metal contact and absorb vibrations from said members, a core comprising a plurality of longitudinal reenforcing members embedded in the resilient body and rigidly interconnected.

9. A core member for a resilient bushing as claimed in claim 8 and further characterized in that the said reenforcing members are rigidly interconnected by a pair of spaced end members to which the said reenforcing members are secured.

FREDERICK M. GUY.

REFERENCES CITED

The following references are of record in the file of this patent:

UNITED STATES PATENTS

| Number | Name | Date |
|---|---|---|
| 1,978,940 | Guy | Oct. 30, 1934 |
| 2,002,122 | McWane | May 21, 1935 |
| 2,309,446 | Ekkebus | Jan. 26, 1943 |

FOREIGN PATENTS

| Number | Country | Date |
|---|---|---|
| 144,435 | Great Britain | June 17, 1920 |

Certificate of Correction

May 2, 1950

Patent No. 2,505,766

FREDERICK M. GUY

It is hereby certified that error appears in the printed specification of the above numbered patent requiring correction as follows:

Column 2, line 16, for the word "bushing" read *bushings*; column 5, line 14, for "ragid" read *rigid*; column 6, line 14, for "longtiudinally" read *longitudinally*; and that the said Letters Patent should be read as corrected above, so that the same may conform to the record of the case in the Patent Office.

Signed and sealed this 17th day of October, A. D. 1950.

[SEAL]

THOMAS F. MURPHY,
*Assistant Commissioner of Patents.*